May 16, 1967 J. R. GLASSER 3,320,552
BAND LIMITED FREQUENCY MODULATION SYSTEM
Filed June 3, 1964
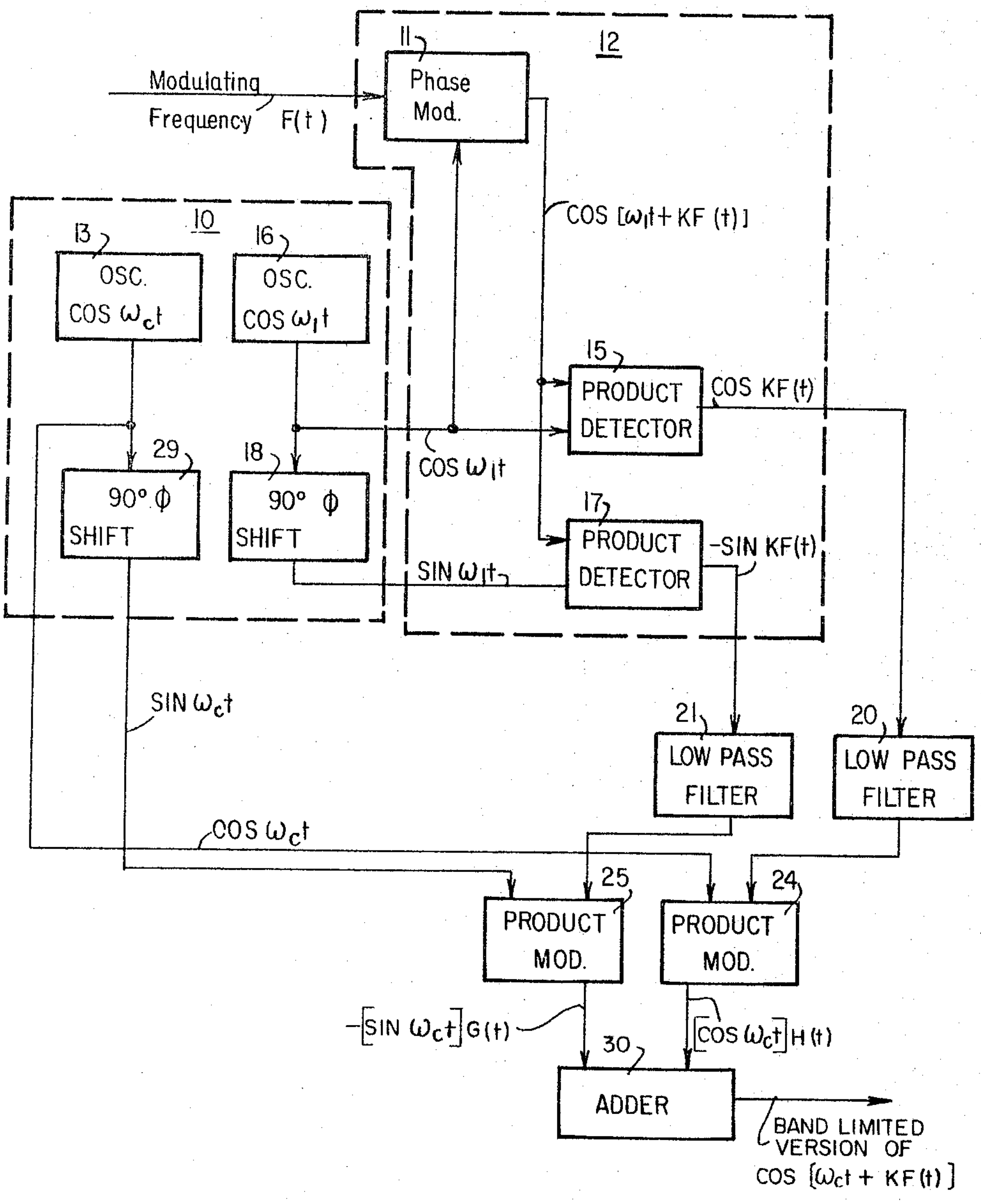
INVENTOR.
JAMES R. GLASSER
BY Mueller & Aichele
Attys.

3,320,552

BAND LIMITED FREQUENCY MODULATION SYSTEM

James R. Glasser, Naperville, Ill., assignor to Motorola, Inc., Franklin Park, Ill., a corporation of Illinois Filed June 3, 1964, Ser. No. 372,262
9 Claims. (Cl. 332—23)

This invention relates to frequency modulation techniques, and in particular to the generation of a bandwidth limited frequency modulated signal.

An ideal frequency modulated transmitter will theoretically produce a signal having a spectrum that is infinitely broad. In practice a signal having a bandwidth of two times the deviation frequency will transmit a high quality voice signal. However, the signal spectrum does not decay rapidly enough outside of this bandwidth of two times the deviation frequency to prevent interference to stations at channel spacings of, for example, three times the peak deviation frequency when conditions are unfavorable.

In order to conserve the radio spectrum it is desirable to limit the bandwidth of the transmitted frequency modulated signal. This can be done by filtering the radio frequency signal to remove undesirable frequencies. Filtering the transmitter output is difficult because sufficient selectivity cannot be obtained at the frequencies involved unless crystal filters are employed, and they have limited power handling capability. It is desirable to do the filtering at lower power levels and at audio frequencies where filters having sufficient selectivity are available. This, however, presents a problem as filtering of the audio modulating signals directly does not provide the desired bandwidth limitation in the transmitted frequency modulated signal.

It is, therefore, an object of this invention to provide a frequency modulated transmitter having an output signal with a limited bandwidth to minimize adjacent channel interference.

Another object of this invention is to provide a frequency modulated transmitter in which the bandwidth of the output signal is limited by the filtering of audio frequencies.

Another object of this invention is to provide a frequency modulated transmitter with a trigonometric function generator to generate trigonometric functions of a modulating signal in real time.

A feature of this invention is the provision of a frequency modulated transmitter including a trigonometric function generator for producing signals which are functions of the modulating signal and which are filtered to thereby limit the bandwidth of the transmitter output signal.

Another feature of this invention is the provision of a frequency modulated transmitter in which a frequency modulation signal of limited bandwidth is generated by multiplying filtered trigonometric function signals of the modulating signal by quadrature carrier signals.

Another feature of this invention, is the provision of a frequency modulated transmitter with a trigonometric function generator which generates two separate trigonometric functions of a modulating signal by product detecting an angular modulated carrier signal with quadrature signals of the carrier signal.

The invention is illustrated in the drawing which is a block diagram of the system.

In practicing this invention a frequency modulated transmitter is provided with a trigonometric function generator for generating two separate trigonometric function signals of the modulating signal. The trigonometric function signals are filtered in low pass filters to remove frequency components which will generate undesired frequencies in the output frequency modulated signal. Each of the filtered trigonometric function signals are multiplied by a separate one of quadrature carrier signals in product modulators and the outputs of the product modulators are added to form a frequency modulated signal of limited bandwidth.

In generating the two trigonometric function signals of the modulating signal, an angular modulator is provided which modulates a second carrier signal with the modulating signal to form an angular modulated signal. The angular modulated signal is product detected by quadrature signals of the second carrier signal and filtered to produce the two trigonometric function signals required by the transmitter.

A mathematical expression for an angular modulated signal is $$\cos [\omega_c t + KF(t)] \quad (1)$$

where:

$F(t)$ is the integral of the modulating frequency,
K is a constant fixing the deviation, and
$\omega_c t$ is the angular carrier frequency.

Equation 1 can be written in the form $$\cos \omega_c t \cos KF(t) - \sin \omega_c t \sin KF(t)$$

and expanded to the form $$\cos \omega_c t[A_0 + A_1 \cos \omega_m t + B_1 \sin \omega_m t + A_2 \cos 2\omega_m t + B_2 \sin 2\omega_m t + \ldots + \ldots] - \sin \omega_c t[A_0' + A_1' \cos \omega_m t + B_1' \sin \omega_m t + A_2' \cos 2\omega_m t + \ldots + \ldots] \quad (2)$$

The terms in the brackets are the Fourier representations of cos $KF(t)$ and sin $KF(t)$. Each term of the series when separately multiplied by cos $\omega_c t$ and sin $\omega_c t$, quadrature carrier frequencies, will generate sum and difference frequencies which, when added together, will form the frequency modulated signal represented by Equation 1.

If the signals represented by the Fourier series cos $KF(t)$ and sin $KF(t)$ are cut off at some frequency by filtering, the frequency modulation spectrum will be limited to exactly two times this frequency. Thus a bandwidth limited frequency modulation signal can be geenrated by multiplying the filtered signals represented by functions cos $KF(t)$ and sin $KF(t)$, by the quadrature carrier signals cos $\omega_c t$, and sin $\omega_c t$ and adding the resulting signals.

A block diagram of the system for producing a frequency modulated signal of limited bandwidth is shown in the drawing. An oscillator system 10 generates two pair of quadrature carrier signals which can be represented by sin $\omega_1 t$, cos $\omega_1 t$ and sin $\omega_c t$, cos $\omega_c t$. Oscillator 13 generates an output signal cos $\omega_c t$ which is coupled to 90° phase shifter 29 to generate the quadrature signal sin $\omega_c t$. Oscillator 16 generates an output signal cos $\omega_1 t$ which is coupled to 90° phase shifter 18 to generate the quadrature carrier signal sin $\omega_1 t$. Oscillator system 10 is not limited to the configuration shown and any system which generates at least one pair of quadrature carrier signals may be used.

A modulating frequency F$(t)$ and the output of oscillator 16 are coupled to modulator 11. The output signal from modulator 11 can be represented as $$\cos [\omega_1 t + KF(t)]$$

which is a mathematical expression for an angular modulated signal as shown in Equation (1). The output signals from oscillator 16 (cos $\omega_1 t$) and 90° phase shifter 18 (sin $\omega_2 t$) are coupled to product detectors 15 and 17 respectively. The output signal from phase modulator 11 cos $[\omega_1 t + KF(t)]$ is also coupled to product detectors 15 and 17. The signal developed in product detector 15 can be expressed as $$\cos KF(t) + \cos 2\omega_1 t \cos KF(t) - \sin 2\omega_1 t \sin KF(t) \quad (3)$$

Similarly, the signal developed in product detector 17 can be expressed as $$-\sin KF(t)+\cos 2\omega_1 t \sin KF(t)+\sin 2\omega_1 t \cos KF(t) \quad (4)$$

The frequency $2\omega_1$ is very much higher than the frequency of the modulating components contained in the terms of $\cos KF(t)$ and $\sin KF(t)$. Low pass filters are incorporated in the outputs of product detectors 15 and 17 to reject the frequency $2\omega_1$, so that the terms in Equations 3 and 4 which contain spectrum bands centered at $2\omega_1$ are filtered out. The resultant outputs from product detectors 15 and 17 are the trigonometric functions $\cos KF(t)$ and $-\sin KF(t)$.

The output signal from detector 15 is filtered in low pass filter 20 to remove those frequencies of the signal which will contribute to undesired frequencies in the final frequency modulated signal from adder 30, and is coupled to product modulator 24. The output of product detector 17 is also filtered in low pass filter 21 and coupled to product modulator 25. The quadrature carrier signals, $\cos \omega_c t$ from oscillator 13 and $\sin \omega_c t$ from phase shifter 29 are coupled to product modulators 24 and 25 respectively. The filters 20 and 21 may be known low pass audio frequency filters.

The result of the multiplication in product modulator 25 is a signal represented by the equation $$[-\sin \omega_c t]G(t)$$

where $G(t)$ is the filtered version of $\sin KF(t)$. The result of the multiplication in product modulator 24 is the signal represented by the equation $$[\cos \omega_c t]H(t)$$

where $H(t)$ is the filtered version of $\cos KF(t)$. The output signals from product modulators 24 and 25 are coupled to adder 30 which adds the input signals to produce an output signal $$\cos \omega_c t H(t)-\sin \omega_c t G(t) \quad (5)$$

Equation 5 is the bandwidth limited version of the signal $$\cos \omega_c t \cos KF(t)-\sin \omega_c t \sin KF(t)=\cos [\omega_c t+KF(t)] \quad (6)$$

Equation 6 is the equation for an angular modulated carrier signal and is the same as Equation 1. However, the terms representing $\sin KF(t)$ and $\cos KF(t)$, which are shown expanded in Equation 2, have been filtered in low pass filters 20 and 21 to remove frequency terms higher than the cut off frequency of the filters and the output signal from adder 30, Equation 5, will be the bandwidth limited version of $$\cos [\omega_c t+KF(t)]$$

Thus an angular modulated signal of limited bandwidth is provided to minimize adjacent channel interference while maintaining the required signal quality. A method of generating trigonometric function signals has also been shown. The bandwidth of the frequency modulated signal is limited by filtering the trigonometric function signals. This filtering can be carried out with audio filters to provide the required filter selectivity at a minimum cost.

I claim:

1. A system for limiting the bandwidth of an angular modulated signal, including in combination, oscillator means for producing first and second pairs of quadrature carrier signals, angular modulation means coupled to said oscillator means and adapted to receive a modulating signal, said angular modulation means being responsive to said modulating signal and to one of said first pair of quadrature carrier signals to produce an angular modulated signal, a pair of product detector means coupled to said angular modulation means, circuit means coupling each of said product detector means to said oscillator means, each of said product detector means being responsive to said angular modulated signal and to a separate one of said first pair of quadrature carrier signals to produce a trigonometric function signal, a pair of product modulator means coupled to said oscillator means each receiving a different one of said second pair of quadrature carrier signals, a pair of low pass filter means each coupling a different one of said product detectors to a separate one of said product modulator means, each of said low pass filter means being responsive to said trigonometric function signals to limit the bandwidth thereof, and adder means coupled to said product modulator means, said product modulator means and said adder means being responsive to said trigonometric function signals and to said second pair of quadrature carrier signals to generate a bandwidth limited frequency modulator signal.

2. A system for limiting the bandwidth of an angular modulated signal, including in combination, oscillator means for producing first and second pairs of quadrature carrier signals, angular modulation means coupled to said oscillator means and adapted to receive a modulating signal, said angular modulation means being responsive to said modulating signal and to one of said first pair of quadrature carrier signals to produce an angular modulated signal, first and second product detector means coupled to said angular modulation means, circuit means coupling each of said product detector means to said oscillator means, said first product detector means being responsive to said angular modulated signal and to one of said first pair of quadrature carrier signals to produce a trigonometric function signal equal to the sine of said modulating signal, said second product detector means being responsive to said angular modulated signal and to the other of said first pair of quadrature carrier signals to produce a trigonometric function signal equal to the cosine of said modulating signal, a pair of product modulator means coupled to said oscillator means each receiving a different one of said second pair of quadrature carrier signals, a pair of low pass filter means each coupling a different one of said product detectors to a separate one of said product modulator means, said low pass filter means being responsive to said trigonometric function signals to limit the bandwidth thereof, adder means coupled to said product modulator means, said product modulator means and said adder means being responsive to said trigonometric function signals and said second pair of quadrature carrier signals to generate a bandwidth limited frequency modulated signal.

3. A system for limiting the bandwidth of an angular modulated signal, including in combination, first and second oscillator means for producing first and second oscillator signals respectively, angular modulation means coupled to said first oscillator means and adapted to receive a modulating signal, said angular modulation means being responsive to said modulating signal and said first oscillator signal to produce an angular modulated signal, first phase shifting means coupled to said first oscillator means and responsive to said first oscillator signal to produce a first quadrature signal, first and second product detector means coupled to said angular modulation means, circuit means coupling said first product detector means to said oscillator means and said second product detector means to said first phase shifting means, said first product detector means being responsive to said angular modulated signal and said oscillator signal to develop a first trigonometric function signal, said second product detector means being responsive to said angular modulated signal and said first quadrature signal to develop a second trigonometric function signal, second phase shifting means coupled to said second oscillator means and responsive to said second oscillator signal to produce a second quadrature signal, first product modulator means coupled to said second oscillator means, second product modulator means coupled to said second phase shifting means, a pair of low pass filter means each coupling a different one of said first and second product detector means to a separate one of said first and second product modulator means, said low pass filter means being responsive to said first and second trigonometric function signals to limit the bandwidth thereof, adder means coupled to said first and second product modulator means, said first and second product modulator means and said adder means being responsive to said first and second function signals and to said second oscillator and quadrature signals to generate a bandwidth limited frequency modulated signal.

4. A system for generating a trigonometric function of an electrical signal applied thereto, including in combination, oscillator means for generating two quadrature carrier signals, angular modulation means coupled to said oscillator means and adapted to receive the electrical signal, said angular modulation means being responsive to the electrical signal and one of said quadrature carrier signals to produce an angular modulated signal, a pair of product detector means coupled to said angular modulation means, and circuit means coupling each of said product detector means to said oscillator means, each of said product detector means being responsive to said angular modulated signal and to a separate one of said quadrature carrier signals to produce output signals equal to different trigonometric functions of the electrical signal.

5. A system for generating a trigonometric function of an electrical signal applied thereto, including in combination, oscillator means for generating two quadrature carrier signals, angular modulation means coupled to said oscillator means and adapted to receive the electrical signal, said angular modulation means being responsive to the electrical signal and one of said quadrature carrier signals to produce an angular modulated signal, first and second product detector means coupled to said angular modulation means, separate circuit means coupling each of said product detector means to said oscillator means, said first product detector means being responsive to said angular modulated signal and one of said quadrature carrier signals to produce an output signal equal to the sine of the electrical signal, said second product detector means being responsive to said angular modulated signal and the other of said quadrature carrier signals to produce an output signal equal to the cosine of the electrical signal.

6. A system for generating a trigonometric function of an electrical signal applied thereto, including in combination, oscillator means for generating an oscillator signal, angular modulation means coupled to said oscillator means and adapted to receive the electrical signal, said angular modulation means being responsive to the electrical signal and said oscillator signal to produce an angular modulated signal, first and second product detector means coupled to said angular modulation means, phase shifting means coupled to said oscillator means and responsive to said oscillating signal to develop a quadrature signal, circuit means coupling said first product detector means to said oscillator means, and said second product detector means to said phase shifting means, said first product detector means being responsive to said angular modulated signal and said oscillator signal to produce an output signal equal to a first trigonometric function of the electrical signal, said second product detector means being responsive to said angular modulated signal and said quadrature signal to produce an output signal equal to a second trigonometric function of the electrical signal.

7. A system for limiting the bandwidth of an angular modulated signal, including in combination, a trigonometric function generator adapted to receive a modulating signal and responsive thereto to generate a plurality of trigonometric function signals of said modulating signal, oscillator means for generating two quadrature carrier signals, a pair of product modulator means coupled to said oscillator means each receiving a different one of said quadrature carrier signals, a pair of low pass filter means each coupling a different one of said trigonometric function signals to a separate one of said product modulator means, each of said low pass filter means being responsive to said trigonometric function signals therein to limit the bandwidth thereof, and adder means coupled to said product modulator means, said product modulator means and said adder means being responsive to said bandwidth limited trigonometric function signals and said quadrature carrier signals to generate a bandwidth limited frequency modulated signal.

8. A system for limiting the bandwidth of a frequency modulated signal, including in combination, a trigonometric function generator adapted to receive a modulating signal and responsive thereto to generate sine and cosine trigonometric function signals of said modulating signal, oscillator means for generating two quadrature carrier signals, a pair of product modulator means coupled to said oscillator means each receiving a different one of said quadrature carrier signals, a pair of low pass filter means each coupling a different one of said trigonometric function signals to a separate one of said product modulator means, said low pass filter means being responsive to said trigonometric function signals to limit the bandwidth thereof, adder means coupled to said product modulator means, said product modulator means and said adder means being responsive to said bandwidth limited trigonometric function signals and said quadrature carrier signals to generate a bandwidth limited frequency modulated signal.

9. A system for limiting the bandwidth of an angular modulated signal, including in combination, a trigonometric function generator adapted to receive a modulating signal and responsive thereto to generate first and second trigonometric function signals of said modulating signal, oscillator means for generating an oscillator signal, phase shifting means coupled to said oscillator means and responsive to said oscillator to generate a quadrature signal therefrom, first and second product modulator means coupled to said oscillator means and said phase shifting means respectively, first and second low pass filter means each coupling a different one of said first and second trigonometric function signals to said first and second product modulator means respectively, said first and second low pass filter means being responsive to said trigonometric function signals to limit the bandwidth thereof, adder means coupled to said first and second product modulator means, said first and second product modulator means and said adder means being responsive to said bandwidth limited trigonometric function signals and to oscillator and said quadrature signals to generate a bandwidth limited frequency modulated signal.

References Cited by the Examiner

UNITED STATES PATENTS

| | | | |
|---|---|---|---|
| 2,624,041 | 12/1952 | Evans | 333—23 |
| 3,253,223 | 5/1966 | Kettel | 332—22 |

ROY LAKE, *Primary Examiner.*

A. L. BRODY, *Assistant Examiner.*